No. 675,555. Patented June 4, 1901.
E. D. CHAPLIN & H. G. HALLORAN.
ELECTROLYTIC PRODUCTION OF WHITE LEAD.
(Application filed July 5, 1900.)
(No Model.)
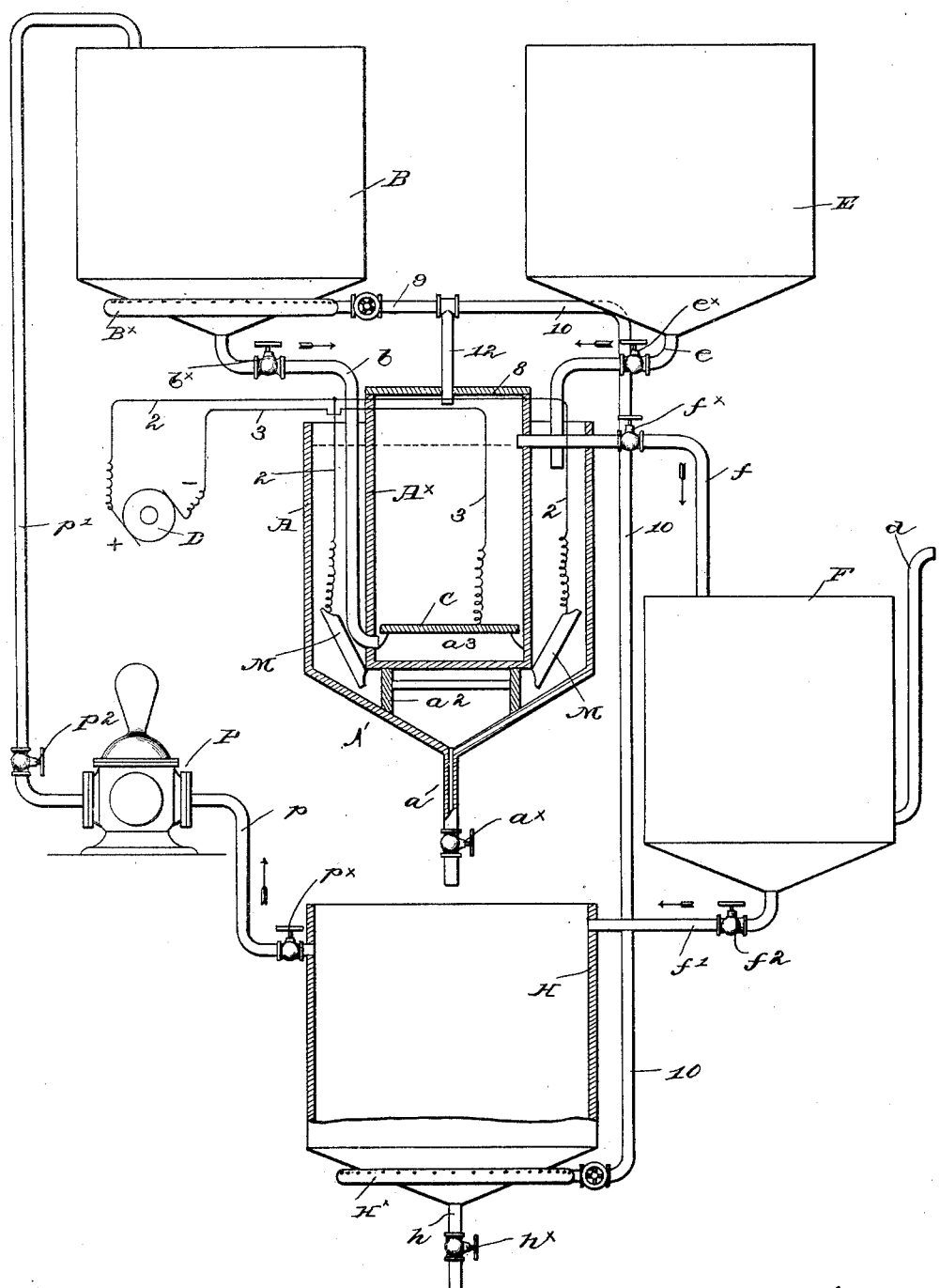
Witnesses.
Inventors:
Edwin D. Chaplin
Henry G. Halloran.
by Crosby Gregory
attys.

UNITED STATES PATENT OFFICE.

EDWIN D. CHAPLIN, OF WINCHESTER, AND HENRY G. HALLORAN, OF BOSTON, MASSACHUSETTS.

ELECTROLYTIC PRODUCTION OF WHITE LEAD.

SPECIFICATION forming part of Letters Patent No. 675,555, dated June 4, 1901.

Application filed July 5, 1900. Serial No. 22,510. (No specimens.)

*To all whom it may concern:*

Be it known that we, EDWIN D. CHAPLIN, a resident of Winchester, county of Middlesex, and HENRY G. HALLORAN, a resident of Boston, county of Suffolk, State of Massachusetts, citizens of the United States, have invented an Improvement in Electrolytic Production of White Lead, of which the following is a specification.

This invention has for its object the production of an electrolytic process for obtaining pure white lead in the form of a hydrated carbonate from metallic lead.

Heretofore in the manufacture of white lead by electrolytic processes a portion of the salts of lead have been rendered insoluble by continued electrolytic action or the acids used have themselves been decomposed by such action, resulting in low production, impurities in the product, and loss of acids. In our process an electric circuit is completed through a suitable electrolyte, which under the influence of the electric current, the metal serving as the anode, is separated into a solvent of lead in the anode-compartment and an alkaline hydrate in the cathode-compartment. The solvent acts upon the lead to form a soluble salt of lead which by continued electrolytic action in the presence of an agent which will separate the lead from its solvent is changed successively into oxychlorid of lead, which is soluble at all ordinary temperatures, the agent preferably being introduced as a salt having the same base as that of the original electrolyte in order that the process may be continuous and the original electrolyte solution recovered in condition for further use. The oxychlorid of lead in solution is precipitated, preferably, by the action of a carbonate of an alkaline base as a hydrated carbonate of lead, and the remaining solution is the electrolyte in substantially its original condition—viz., an aqueous solution of a non-alkaline salt with some chlorate and chlorid. The alkaline hydrate in the cathode-compartment of the electrolyzer is drawn off and subjected to the action of carbon dioxid, forming a carbonate of an alkaline base, which is used, as before stated, to form with the oxychlorid the hydrated carbonate of lead precipitated.

The drawing, partly in section and partly in elevation, represents one convenient form of apparatus by means of which our invention may be practiced.

A suitable tank A, having, preferably, a hopper-bottom A', provided with an outlet-pipe $a$ and a suitable controlling-valve $a^\times$, has placed within it upon supports, as $a^2$, a second chamber or tank $A^\times$, of suitable porous material, as earthenware.

The metallic lead to be acted upon is placed in the outer compartment, preferably in the form of pigs M, electrically connected by wires 2 with the positive pole of a suitable source of electric energy, as a dynamo D, the metal forming the anode, and a plate C, of copper or other metal not affected by electrolytic action, is placed in the inner compartment or chamber $A^\times$ and forms the cathode, connected electrically by wire 3 to the negative pole of the dynamo. Supports $a^3$ hold the cathode above the bottom of the chamber.

In carrying out the process we prefer to use as the electrolyte an aqueous solution of a non-alkaline salt—as, for instance, nitrate of sodium or potassium or acetate of sodium or potassium, &c.—and as an aqueous solution of nitrate of sodium is well adapted for the conduct of the process we will hereinafter refer more particularly to such a solution as the "electrolyte."

The electrolyte is introduced into the inner compartment $A^\times$ of the cell or electrolyzer, preferably below the cathode C, by a pipe $b$, having a controlling-valve $b^\times$ and leading from a tank B, for convenience elevated above the electrolyzer A. An overflow-pipe $f$, having a valve $f^\times$, leads from the normal level of the electrolyte in the cell to a tank F, which in turn is connected by pipe $f'$, having a valve $f^2$, to a tank H, shown as having a hopper-bottom and an outlet $h$, provided with a valve $h^\times$, and for convenience in operation the said tank is located below the outlet $a$ of the electrolyzer A. A pump P has its suction connection by pipe $p$ with the upper portion of the tank H, the outlet-pipe $p'$ of the pump opening into tank B, suitable controlling-valves $p^\times p^2$ being placed in the pipes. A tank E is provided with a pipe $e$, leading to the electrolyzer and provided with a controlling-valve $e^\times$, and in this tank is placed an aqueous solution of a chlorid salt—such, for instance, as common salt, which is plentiful and cheap. Supposing that we will use an aqueous solution of nitrate of sodium as the electrolyte, the latter is drawn from the tank B by pipe $b$ into the electrolyzer at the beginning of the operation, filling both compartments thereof, the metallic lead M forming the anode, and the electric circuit is completed through the electrolyte after the level of the latter in the compartments A and $A^\times$ reaches the proper point. By the action of the electric current the electrolyte is supposedly separated into a solvent of lead in the anode-compartment and an alkaline hydrate in the cathode-compartment $A^\times$, the solvent acting upon the metallic lead to form a soluble salt of lead—in the present instance lead nitrate. It is known that further action of the current will, if not counteracted, produce nitrites and hyponitrites, and the current acting upon these will produce insoluble basic salts of lead, which separate in the form of crystals, and so far as the ultimate object of the process is concerned they are lost. In the presence of a chlorate, however, these combinations cannot exist, and consequently we add to the electrolyte a solution of a chlorid salt, which is conveniently taken from the tank E. The lead nitrate in solution is thereby transformed into chlorid of lead, which at ordinary temperatures is nearly insoluble; but as solubility of the lead chlorid is necessary at this stage of the process we when starting and establishing the process heat the electrolyte in any suitable manner, as by a burner $B^\times$, arranged beneath the supply-tank B, and the chlorid of lead as it is formed remains in solution in the electrolyzer. The continued action of the electric current oxidizes this chlorid in solution, and it is changed to oxychlorid of lead, which is soluble at all ordinary temperatures. The term "oxychlorid of lead" herein used has its usual meaning—viz., chlorid salts of lead containing oxygen in variable proportions—such, for instance, as $PbClO_3$, $PbO.PbCl_2$, &c. A sufficient quantity of chlorid solution is added to the electrolyte to prevent the presence of any nitrate of lead or its derivatives in the solution. The oxychlorid of lead in solution thus obtained is withdrawn from the electrolyzer by the outlet $a$ and introduced into the tank H, where it is mixed with a carbonate of an alkaline base while hot, a hydrated carbonate of lead being precipitated, which can be withdrawn by means of the pipe $h$. If the solution in the carbonating-tank is cold, a neutral carbonate of lead will be precipitated—an undesirable product—and to maintain the solution hot a burner $H^\times$ is shown below the tank H. The hydrated carbonate of lead so produced is very pure and white, free from any coloring-matter, and it has great covering power.

The apparatus shown is readily adapted for carrying out the entire process, as will be described.

The alkaline hydrate is drawn off from the cathode-compartment $A^\times$ into the tank F, into which carbon dioxid is introduced by a pipe $d$ from any suitable source of supply, (not shown,) forming with the alkaline hydrate a carbonate of an alkaline base, and when a solution of nitrate of sodium is used as the electrolyte carbonate of sodium will be formed in tank F in accordance with the formula $2NaOH + CO_2 = Na_2CO_3 + H_2O$. This carbonate of an alkaline base is admitted to the tank H by the pipe $f'$, and the oxychlorid of lead in solution in said tank is precipitated as a hydrated carbonate of lead, as described. The solution remaining after precipitation is an aqueous solution of a mixture of nitrate of sodium and sodium chlorate and probably some chlorid, which solution is fit to be used again as the electrolyte, and it is pumped from the tank H to the electrolyte-supply tank B.

A small quantity of $PbCl_2$—about two per cent.—is found in the hydrated carbonate of lead, and after the continuity of the process has been fully established it is only necessary to add from time to time sufficient chlorid solution to provide for the formation of this small percentage of $PbCl_2$, making up for the loss thereby occasioned.

The heating of the electrolyte is maintained until the quantity of oxychlorin salt in the solution is equivalent to the amount of lead nitrate produced, after which the process may be continued at lower temperatures.

The process is economical, the necessary chemicals being abundant and cheap, and the solution used as the electrolyte is recovered in condition fit to be used over again as the process is continued.

In the production of the alkaline hydrate in the cathode-compartment one-half of the equivalent of hydrogen is produced, and this liberated hydrogen may be utilized in any desired manner by closing the cathode-compartment and withdrawing the hydrogen. Herein we have shown the compartment $A^\times$ closed tightly by a cover 8, and we utilize the hydrogen for heating the electrolyte and the solution in the carbonating-tank H, pipes 9 and 10 leading to the burners $B^\times$ and $H^\times$ from a pipe 12, which enters the upper part of the cathode-compartment, suitable controlling-valves being placed in the pipes 9 and 10 to regulate the flow of hydrogen to the burners.

The process herein described is not necessarily carried out by the apparatus herein shown, and our invention is in consequence not restricted to the employment of such apparatus.

Having fully described our invention, what we claim, and desire to secure by Letters Patent, is—

1. The process of making white lead by electrolysis, which consists in electrolytically forming from metallic lead as an anode a solution of a soluble salt thereof in the presence of a soluble chlorid salt, to transform the lead salt into chlorid of lead; oxidizing the latter to form oxychlorid, and carbonating the latter to produce a hydrated carbonate of lead.

2. The process of making white lead by electrolysis, which consists in electrolytically dissolving a lead anode in an aqueous solution of a non-alkaline salt in the presence of a soluble chlorid; changing the chlorid of lead so produced to oxychlorid of lead by oxidation, and carbonating the oxychlorid to produce a hydrated carbonate of lead.

3. The process of making white lead by electrolysis, which consists in electrolytically dissolving a lead anode in an aqueous solution of a non-alkaline salt in the presence of a soluble chlorid having the same base; oxidizing the chlorid of lead formed to change it to oxychlorid, in solution, and carbonating the solution to precipitate hydrated carbonate of lead.

4. The process of making white lead by electrolysis, which consists in electrolytically dissolving a lead anode in an aqueous solution of a non-alkaline salt in the presence of heat and a soluble chlorid, to form chlorid of lead and maintain it in solution; oxidizing the chlorid to form oxychlorid of lead in solution, and carbonating the latter to precipitate a hydrated carbonate of lead.

5. The process of making white lead by electrolysis, which consists in electrolytically dissolving a lead anode in a solution of nitrate of sodium as the electrolyte, in the presence of chlorid of sodium, forming chlorid of lead; changing the latter to oxychlorid of lead by oxidation, and finally precipitating hydrated carbonate of lead by treating the oxychlorid of lead in solution with a solution of a carbonate of an alkaline base.

6. The electrolytic process of making white lead, which consists in electrolytically separating a solvent of lead from an electrolyte, and subjecting metallic lead to the action of the solvent in the presence of a soluble chlorid salt, to form chlorid of lead; oxidizing the latter during continued electrolytic action to form oxychlorid of lead in solution, and carbonating the latter to precipitate hydrated carbonate of lead.

7. The electrolytic process of making white lead, which consists in electrolytically forming from metallic lead as the anode, in the presence of a soluble chlorid salt and by oxidation, oxychlorid of lead in solution, and carbonating the latter in the presence of heat, to precipitate a hydrated carbonate of lead.

In testimony whereof we have signed our names to this specification in the presence of two subscribing witnesses.

EDWIN D. CHAPLIN.
HENRY G. HALLORAN.

Witnesses:
JOHN C. EDWARDS,
AUGUSTA E. DEAN.